Aug. 11, 1936. N. M. LOWER Re. 20,062

LOCOMOTIVE TENDER

Original Filed Oct. 29, 1928 2 Sheets-Sheet 1

INVENTOR

Nathan M. Lower

Aug. 11, 1936. N. M. LOWER Re. 20,062

LOCOMOTIVE TENDER

Original Filed Oct. 29, 1928 2 Sheets-Sheet 2

INVENTOR

Nathan M. Lower

Reissued Aug. 11, 1936

Re. 20,062

UNITED STATES PATENT OFFICE 20,062

LOCOMOTIVE TENDER

Nathan M. Lower, Ramsey, N. J., assignor to The Standard Stoker Company, Incorporated, a corporation of Delaware Original application October 29, 1928, Serial No. 315,631, now Patent No. 1,925,670, dated September 5, 1933. Divided and this application March 31, 1930, Serial No. 440,283. Renewed April 26, 1934. Original No. 2,032,943, dated March 3, 1936. Application for reissue June 16, 1936, Serial No. 85,556

40 Claims. (Cl. 105—234)

This invention pertains to locomotive tenders provided with a stoker tender unit or conveyor trough, and is a division of my application Serial No. 315,631, filed October 29, 1928, which issued September 5, 1933, as Letters Patent No. 1,925,670.

In present tender construction the "cut-out" or compartment made to admit the stoker trough displaces a great deal more water than the trough itself and it is one of the objects of this invention to eliminate such a compartment to increase the water carrying capacity of the tender.

The present type of stoker tender unit consists mainly of a trough having a conveyor screw therein, a gear case at the rear of the trough having gears therein, and a drive shaft extending along the trough for rotating the conveyor screw through said gears.

It is another object of the invention to install in old tenders or provide in the building of new tenders such a stoker tender unit so that the water stored in the tender will surround and be in contact with both sides, the bottom and rear of said unit.

In providing a stoker trough in a tender so that the trough will form a portion of the inside surface of the water compartment it is a further object of my invention to have the trough made of relatively few parts to eliminate the number of water-tight connections and possible leakage points. In my construction there are only three parts exposed to water; namely, the tube or conduit around the drive shaft, the gear case cover at the rear of the trough, and the trough itself. The gear case and trough are preferably cast in one piece. The tube around the drive shaft is welded at its ends to the trough making perfect water-tight joints. The gear box cover can easily be made water-tight by providing a suitable gasket between it and the gear case and making a tight joint. The construction described in this paragraph is completed before beginning to install the stoker unit and the only water-tight joints necessary to make when installing the stoker unit in the tender is between the trough and the floor of the fuel bunker, and between the trough and the front sheet or wall of the tender.

Still another object of my invention is the mounting of the stoker engine in a novel manner so that it will not occupy any of the water space but still be carried by the tender. When in position the stoker engine is forward of the front of the tender. It is secured to the stoker trough before the installation of the trough to avoid the expense of mounting it on the tender.

Other features of novelty which are important in this invention, such as the method of protecting and making a rotatable shaft water-tight, or constructing a water-tight gear case, will appear from the following description and appended claims, taken in connection with the accompanying drawings, in which, Fig. 1 is a vertical sectional view taken on the center line of the locomotive and tender, with the invention in part section, showing the invention as applied thereon;

Figure 1:
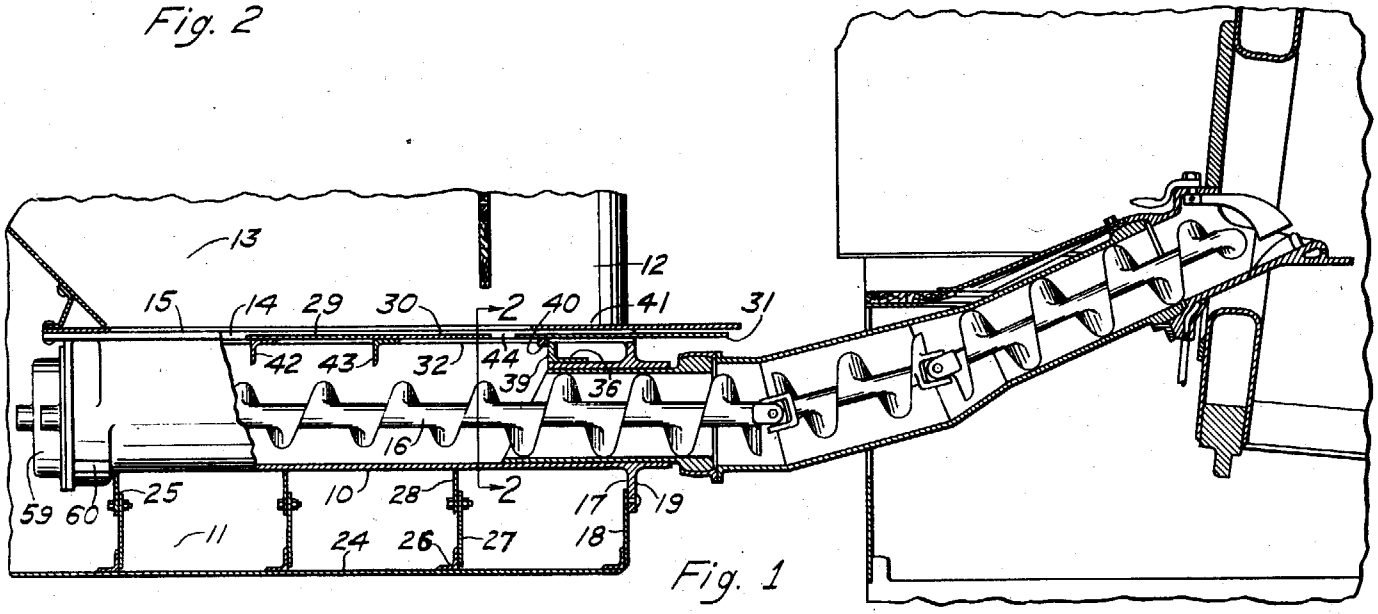

In Fig. 1 the numeral 10 designates the stoker trough which is rigidly mounted in the water compartment 11 of the tender 12 and arranged to receive fuel downwardly from the fuel bunker 13 through the opening 14 in the floor 15 of the bunker. A conveyor screw 16 driven at its rear end, transfers the fuel through the trough to the forward end of the tender where other suitable mechanism delivers it to the firebox in a manner well known to those skilled in the art and need not be described here as the said mechanism forms no part of this application.

Figure 3:
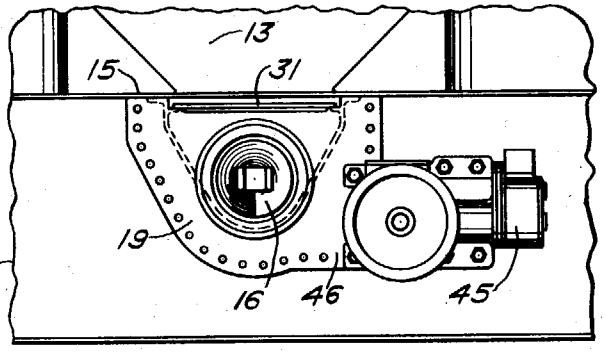
Fig. 3 is a view of the forward end of the stoker trough and a portion of the tender, and illustrates the stoker driving engine mounted on the trough.
Figure 2:
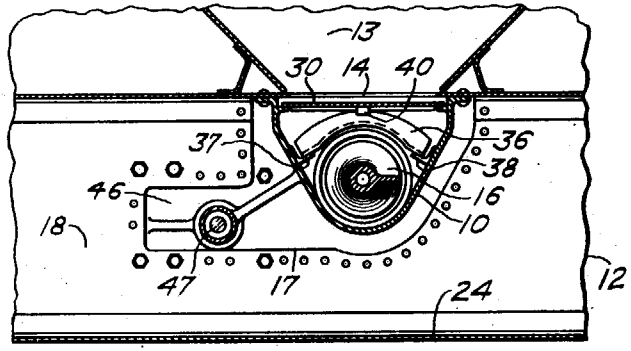
Fig. 2 is a vertical sectional view of the tender and stoker trough taken on line 2—2 of Fig. 1. The trough is shown in this view applied to an old tender that has been made self-cleaning.
Figure 7:
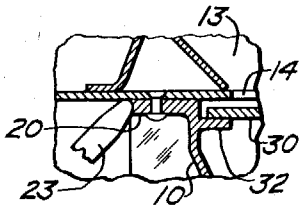
Figs. 6 and 7 illustrate the method of making a water-tight joint.
Figure 6:
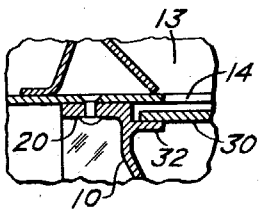
Figure 5:
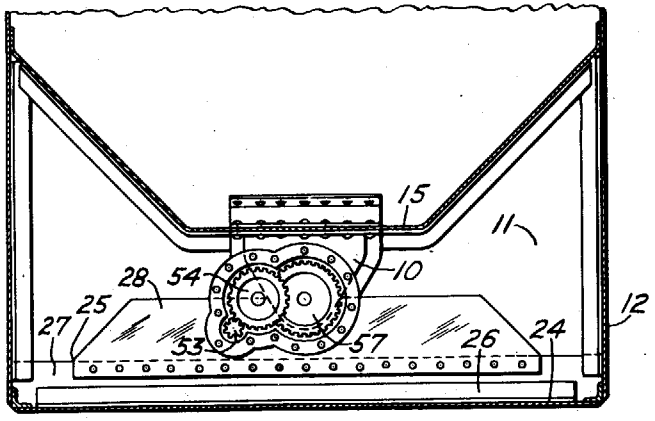
Fig. 5 is a vertical section of part of the tender looking at the rear end of the stoker trough with the gear case cover removed, and illustrates the method of supporting the trough. The trough is shown, in this view, applied to a tender that has been built to be equipped with a stoker.
Figure 4:
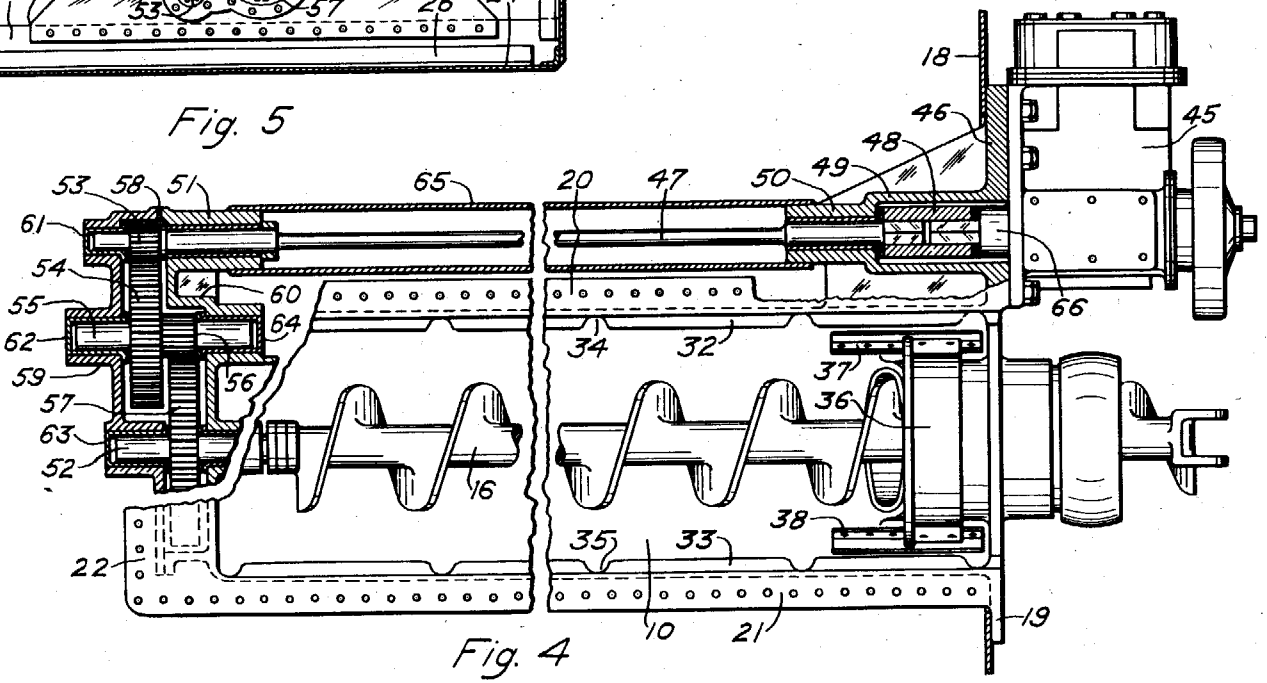
Fig. 4 is a part sectional plan view of the trough, showing the water-tight gear box at the rear, the water-tight shaft at the side, and the driving engine secured at the front.

It will be noted in Fig. 2 that an opening 17 is made in the front sheet 18 of the tender large enough to admit the trough into the water compartment 12. The flange 19, which extends outwardly in a vertical plane around the front of the trough, closes the opening 17 and is securely riveted to the front sheet 18. The trough 10 is preferably made in one main relatively large cast section, to eliminate the number of possible leaking connections, but it may be constructed of plate and angle irons and still be made water-tight. Extending outwardly, in a lateral plane, around the top, on both sides, and at the rear of the trough, are the flanges 20, 21, and 22, which fit tightly against the under side of the bunker floor and are securely riveted thereto. Riveting the flanges 20, 21, 22 and 19 to the tender, as shown in Fig. 6, does not necessarily make a water-tight joint, and these flanges should be calked to make an absolute water-tight connection. The numeral 23, Fig. 7, designates a calking tool.

The trough is supported on the floor 24 of the water compartment by suitable brackets 25. Angle irons 26 are secured to the floor 24 to which the plates 27, which extend the full width of the tender, are riveted. The plates 28 are cut out to fit around the bottom of the trough and are bolted to the plates 27. These bracket connections need not be water-tight as the brackets are entirely in the water compartment. The plates 27 and the angle irons 26 are in position before the trough is admitted in order that there will be sufficient working space. Then all that is necessary to complete the supports after the trough has been inserted is the bolting of the plates 28 to the plates 27. By this construction the entire weight of the coal and trough is supported on the tender frame and avoids the use of plates and brackets necessary to support the fuel bunker as in present tender arrangement for stokers. To remove the trough from the tender the bolts in the brackets 25 are removed and the rivets in the front flange 22 and in the top flanges 17, 18, and 19 are burned out.

The brackets 25 serve also as baffles for the large volume of water swaying in the tender.

Slide plates 29, 30, and 31 are provided at the top of the trough for preventing the entire length of the screw 16 from being exposed to the coal at one time. These slide plates move on the tracks 32 and 33 that extend inwardly and are located a slight distance down from the top of the trough. It is preferable to cast these tracks integral with the trough but angle irons may be used if desired. The tracks 32 and 33 are interrupted by a series of notches 34 and 35, which prevent the coal dust from binding the slide plates by permitting it to fall into the trough as the slide plates are moved. By this design the complicated and expensive track construction used in present tender practice is eliminated. The slide plates can be positioned so as to make an opening for the coal to pour into the trough at its front, middle, or rear, and at will the fireman can completely close the opening between the fuel bunker and the trough.

The large lumps of coal are reduced to a size suitable for proper firing by the screw 16 forcing them against the crushing face of an adjustable crusher 36, which is supported on the angle irons 37 and 38. The crusher is rigidly secured to the angle irons 37 and 38 after it has been positioned at the most desirable location. The crushing surface 39 of the crusher is substantially vertical. Secured to the under side of the forward slide plate 31 is the abutment 40 which comes in contact with surface 39 when the slide plate 31 is moved forward, thus preventing its further forward movement. The abutment 40 is positioned slightly forward of the rear end of the slide plate 31 so that when the abutment is in contact with the crushing surface 39 (as shown in Fig. 1) a portion of the slide plate 31 is rearward of the crusher and the coal that is forced against the surface 39 cannot be forced upward onto the tender deck 41, which often occurs with the use of the present conical shaped crusher. The large lumps of coal lodging against the crushing face 39 are crushed against one another.

To the under side of the slide plates 29 and 30 are attached the downwardly extending angle irons 42 and 43 for decreasing the area through which the coal is conveyed, to prevent the trough from filling with coal at and near the crushing zone, which would bind and may stop the conveyor screw.

A stoker driving engine 45 is bolted to the large flange 46, which extends outwardly in a vertical plane, on one side, at the front of the trough. The crank shaft of the engine 45 is connected to a drive shaft 47 by a coupling 48 enclosed in the housing 49. The housing 49 is preferably cast integral with the flange 46 and the trough (as shown) but the housing 49 and flange 46 may be made separate and secured to the trough in any suitable manner. The drive shaft 47 is paralleled to the center of the trough and conveyor screw and is supported at its front and rear in bearings 50 and 51. Making the drive shaft 47 parallel to the trough and conveyor screw eliminates universal connections that may be necessary if the shaft is not parallel to the trough and screw. In order to rotate the screw 16 at the proper speed, which is considerably slower than the speed of the crank shaft of the engine 45, a gear reduction is provided at the rear of the trough for connecting and reducing the speed from the drive shaft 47 to the rear screw shaft 52. Mounted near the rear end of the drive shaft 47 is a drive pinion 53 in mesh with and driving the intermediate gear 54 and the intermediate shaft 55. The intermediate pinion 56, on the intermediate shaft 55, is in mesh with and drives the gear 57, the rear screw shaft 52 and the conveyor screw.

A novel feature of the gear case is that it is water-tight. By providing the proper gasket 58 and coating it with shellac just before assembling the parts a water-tight joint may readily be made between the gear case cover 59 and the gear case 60. Bushings provided with a closed end, or "blind bushings" 61, 62, 63, and 64, are pressed in the gear case cover and gear case as bearings for the shafts in the gear case and prevent any water from leaking into the gear case around the shafts.

Another novel feature necessary in my invention is a water-tight rotatable drive shaft extending through the water compartment of the tender between the stoker engine and the conveyor screw. A tube 65, not much greater in diameter than the drive shaft itself, is split at its ends, is forced over the bearings 50 and 51, and welded to said bearings to make water-tight joints. If the tube 65 were not provided, water could leak through the bearings 50 and 51 into the gear case, into the housing 49, and probably through the stoker engine crank shaft bearing 66 to the inside of the engine.

I have shown and described what I believe is the preferred construction of my invention but others skilled in the art may see various improvements, so I do not wish to be limited to the construction shown, except insofar as I have included such limitations within the terms of the following claims.

I claim:

1. The combination with a locomotive tender having a fuel bunker and a water compartment; a stoker trough secured to the floor of the bunker, baffles in the water compartment extending upwardly from the floor of the water compartment and terminating short of the floor of the bunker, said baffles supporting said trough.

2. The combination with a locomotive tender having fuel and water compartments; a stoker trough mounted in said water compartment so that water contacts its bottom and sides, said trough being in communication with the fuel compartment, gearing at the rear of said trough, a housing enclosing said gearing, transfer means in said trough, a prime mover disposed without said water compartment for driving said transfer means, a shaft between said gearing and said prime mover, said shaft extending through the water compartment, and a tube within the water compartment surrounding said shaft for protecting it from the water and extending between said housing and a wall of said water compartment.

3. The combination with a locomotive tender having a water compartment; of a stoker trough mounted in said compartment, a gear case at the rear of the trough, said gear case being exposed to the water in said compartment, a gear case cover secured to said gear case, means between said cover and said case to make a water-tight fit, and "blind bushings" pressed in said cover and case to make water-tight bearings.

4. The combination with a locomotive tender having a water compartment; of a stoker trough rigidly secured in and made water-tight with the compartment, a gear case at the rear of the trough in contact with the water in said compartment, said gear case being water-tight.

5. In a locomotive tender, an underframe structure, a stoker trough mounted on said structure, and a stoker drive shaft housing spaced from the side of said trough, the space between said trough and housing constituting a part of the liquid receiving tank of the tender.

6. The combination in a locomotive tender of a base portion, a body portion comprising fuel and water compartments and partition plates separating said compartments, a cast metal trough extending into said water compartment and provided with an opening communicating with said fuel compartment, a gear housing rearwardly of said trough and formed therewith, a drive shaft casing extending along one side of said trough and formed therewith, said drive shaft casing opening into said gear housing at its rearward end and opening exteriorly of said water compartment at its forward end.

7. The combination in a locomotive tender of a base portion, a body portion comprising fuel and water compartments, partition plates separating said compartments, a cast metal trough securely attached to the lower marginal portions of said plates, said trough extending into the water compartment and communicating with an opening in the floor of said fuel compartment, a gear housing rearwardly of said trough and formed therewith and a drive shaft casing formed with and extending substantially the length of said trough and communicating with said gear housing at its rearward end, said gear housing and drive shaft casing being disposed within the water compartment.

8. The combination in a locomotive tender of a base portion, a body portion comprising fuel and water compartments, partition plates separating said compartments, a cast metal trough extending into said water compartment and communicating with an opening in the floor of said fuel compartment, a screw conveyor disposed in said trough having a gear drive at its rearward end, a water-tight housing formed integral with said trough enclosing said gearing, a drive shaft operatively connected with said gear drive and a watertight casing formed integral with said trough enclosing said shaft and opening at its rearward end into said gear drive housing.

9. A stoker conveyor trough for a locomotive tender made in a single casting and having inturned flanges for the sliding plates for regulating the flow of material to the trough, said inturned flanges being apertured to prevent the accumulation of materials on the slideways of the flanges.

10. In a locomotive tender having a water storage compartment and fuel bunker; a stoker trough in communication with the fuel bunker and disposed within said compartment so that water will be in contact with the sides and bottom of the trough, a conveyor screw in said trough, gearing at the rear of said trough, and a stoker driving engine operatively connected with said gearing.

11. The combination in a locomotive tender of a base portion, a body portion comprising fuel and water compartments, partition plates separating said compartments, a cast metal trough communicating with an opening in the floor of said fuel compartment, a housing rearwardly of and formed with said trough, a casing extending along one side of and formed with said trough and opening into said housing at its rearward end, fuel conveying means disposed in said trough, gearing in said housing for operating said conveying means, and a jointed shaft in said casing operatively connected with said gearing at its rearward end and at its forward end exteriorly of said water compartment with power transmitting means.

12. In a locomotive tender having a water storage compartment and a fuel bunker; an integral trough structure in communication with the fuel bunker and disposed within said compartment so that water will be in contact with the sides and bottom of the trough, a conveyor screw in said trough, a gear case at the rear of the said trough having a bearing for said conveyor screw, a driving shaft, and an outside bearing for the driving shaft, said bearings being made integral with the body of the trough.

13. The combination in a locomotive tender of a base portion, a body portion comprising fuel and water compartments, partition plates separating said compartments, a cast metal trough extending into the water compartment and communicating with an opening in the floor of said fuel compartment, a housing rearwardly of and formed with said trough, a casing extending along one side of and formed with said trough and opening into said housing at its rearward end and opening exteriorly of said water compartment at its forward end, fuel conveying means disposed in said trough, gearing in said housing for operating said conveying means, and a jointed shaft in said casing, the rearward portion thereof carrying a pinion operatively engaging the gearing in said housing, and the forward portion of said shaft being supported at its forward end in said casing by a bearing member, means for preventing forward movement of said jointed shaft, said shaft being operatively connected with power transmitting means.

14. In a locomotive tender having fuel and water compartments, a vertically disposed wall at the front of said tender forming the front wall of said water compartment, said wall having an opening therethrough intermediate the side walls of the tender, a stoker conduit mounted within said water compartment contacting the water therein, said opening in the front wall of the water compartment being of greater width and height than said conduit, a flange extending laterally from the conduit adjacent the front end of the tender, said flange at its marginal edge arranged with the front wall of the water compartment and its associated walls to form a closure for said opening.

15. In a locomotive tender having fuel and water compartments, a vertical sheet at the front end of the tender forming the front wall of said water compartment, said sheet being apertured to permit the introduction of a stoker conduit, a stoker conduit mounted within said water compartment contacting the water therein and extending through the aperture of said sheet, the marginal edges of the aperture being spaced from the walls of the conduit, and a flange extending laterally from the conduit and arranged with said sheet to form a closure for said aperture, the flange constituting a part of the front wall of the water compartment.

16. In a locomotive tender having fuel and water compartments, a vertical wall at the front end of the tender forming the front wall of said water compartment, said wall being apertured to permit the introduction of a stoker conduit, a stoker conduit mounted within said water compartment contacting the water therein and extending through the aperture of said wall, the marginal edges of the aperture being spaced from the walls of the conduit, a flange extending laterally from the conduit and arranged with said vertical wall to form a closure for said aperture, the flange constituting a part of the front wall of the water compartment, conveying means in said conduit, gearing at the rear of said trough for driving said conveying means, a housing shielding said gearing from the water in the water compartment, a casing extending between said housing and said laterally extending flange and at its rearward end opening in to said housing and at its forward end opening through said flange, and a drive shaft in said casing at its rearward end being operatively connected with said gearing.

17. In a locomotive tender having fuel and water compartments, a vertical wall at the front end of the tender forming the front wall of said water compartment, said wall being apertured to permit the introduction of a stoker conduit, a stoker conduit mounted within said water compartment contacting the water therein and extending through the aperture of said wall, the marginal edges of the aperture being spaced from the walls of the conduit, a flange extending laterally from the conduit and arranged with said vertical wall to form a closure for said aperture, the flange constituting a part of the front wall of the water compartment, conveying means in said conduit, gearing at the rear of said trough for driving said conveying means, a housing shielding said gearing from the water in the water compartment, a casing extending between said housing and said laterally extending flange and at its rearward end opening into said housing and at its forward end opening through said flange, a drive shaft in said casing at its rearward end being operatively connected to said gearing, and a prime mover carried by said flange and having its power shaft connected to said drive shaft.

18. In a locomotive tender, an underframe structure, a stoker trough mounted on said structure, a stoker drive shaft housing spaced from the side of said trough, the space between said trough and housing constituting a part of the liquid receiving tank of the tender, and a flange integral with the trough at one end thereof extending laterally and receiving said drive shaft housing.

19. In a locomotive tender, an underframe structure, a stoker trough mounted on said structure, a stoker drive shaft casing spaced from the side of said trough, the space between said trough and casing constituting a part of the liquid receiving tank of the tender, a flange integral with the trough at one end thereof extending laterally and receiving said drive shaft housing, and a gear housing at the other end of said trough having an opening communicating with the trough and another opening communicating with said casing.

20. In a locomotive tender having a water storage compartment and a fuel bunker, a stoker trough in communication with the fuel bunker and disposed within said compartment so that water will be in contact with the sides and bottom of the trough, a conveyor screw in said trough, gearing at the rear of said trough, and a stoker engine operatively connected with said gearing and mounted exteriorly of the water compartment.

21. In a locomotive tender having a water storage compartment and a fuel bunker, a stoker trough in communication with the fuel bunker and disposed within said compartment so that water will be in contact with the sides and bottom of the trough, a conveyor screw in said trough, gearing at the rear of said trough, a housing in said water compartment shielding the gearing from the water of the water compartment, and a stoker driving engine operatively connected with said gearing and being mounted exteriorly of the water compartment.

22. In a locomotive tender having a water storage compartment and a fuel bunker, a stoker trough in communication with the fuel bunker and disposed within said compartment so that water will be in contact with the sides and bottom of the trough, a conveyor screw in said trough, gearing at the rear of said trough, a housing in said water compartment shielding the gearing from the water of said compartment, a stoker engine mounted exteriorly of the water compartment, a drive shaft extending between the gearing and the stoker engine, and a casing surrounding that part of said drive shaft disposed within the water compartment and extending between said housing and a wall of said water compartment.

23. In a locomotive tender having a water storage compartment and a fuel bunker, a stoker trough in communication with the fuel bunker and disposed within said compartment so that water will be in contact with the sides and bottom of the trough, a conveyor screw in said trough, gearing at the rear of said trough, a housing rearward of said trough for enclosing said gearing, a stoker driving engine mounted at the front end of the tender exteriorly of the water compartment, a drive shaft operatively connecting said engine with said gearing, and a casing surrounding that portion of said shaft disposed within the water compartment protecting the same from the water of said compartment, said casing at one end opening in to said housing and at its other end opening through the front wall of the tender.

24. In a locomotive tender having a water storage compartment and a fuel bunker, a stoker trough in communication with the fuel bunker and disposed in said compartment to contact the water therein, a conveyor screw in said trough, gearing at the rear of said trough, a housing shielding said gearing from the water of the water compartment, a stoker driving engine mounted on an exterior wall of said compartment, a drive shaft extending through said exterior wall and operatively connecting the driving engine with said gearing, and a casing within said compartment surrounding said shaft and extending between the housing and said exterior wall.

25. In a locomotive tender having a deck, a stoker trough, fuel transfer means in said trough, power means for driving said transfer means, said power means being rigidly secured to said trough and positioned forward of the tender beneath the deck of the tender.

26. In a locomotive tender having a deck, a stoker trough rigidly secured in the tender, fuel transfer means in said trough, power means for driving said transfer means, said power means being rigidly secured to and carried by said trough and positioned beneath the deck of the tender.

27. In a locomotive tender, a stoker trough, a conveyor screw in said trough, gearing at the rear of said trough, a shaft extending forward from said gearing, power means connected to the forward end of said shaft, said power means being rigidly secured to said trough at the forward end of the trough.

28. In a locomotive tender, a stoker trough, an engine carried by said trough, said engine being positioned at the forward end of the tender beneath the deck of the tender, a conveyor screw in said trough driven at its rear end through gearing and a shaft extending along the side of said trough, said shaft being supported in a bearing at its forward end and coupled to said engine.

29. In a locomotive tender, a stoker trough, fuel transfer means in said trough, power means for driving said transfer means, a flange cast integral with said trough near its forward end of one side, said power means being rigidly secured to said flange and positioned at the forward end of the tender beneath the deck of the tender.

30. In a locomotive tender having an upright wall at its forward end, and a deck; a stoker trough mounted in the tender, power means, a conveyor screw in said trough driven at its rear end through gearing and a shaft connecting the gearing with the power means, said power means being supported by said wall and positioned beneath the deck.

31. In a locomotive tender having an upright wall forming the forward end thereof, a deck extending forward from said wall, a water storage compartment and a fuel bunker; a stoker trough mounted in the tender, a conveyor screw in the trough, gearing at the rear end of the trough, power means for actuating the conveyor screw, said power means being positioned forward of said upright wall, said compartment and fuel bunker, and beneath the deck, and a drive shaft operatively connecting said gearing with the power means.

32. In a locomotive tender having an upright wall forming the forward end thereof, a deck extending forward from said wall, a water storage compartment and a fuel bunker; a stoker trough rigidly mounted in the tender, a conveyor screw in the trough, gearing at the rear end of the trough, power means for driving the conveyor screw rigidly mounted on the tender, said power means being positioned forward of said upright wall, said compartment and fuel bunker, and beneath the deck, and a drive shaft operatively connecting the gearing with the power means, said shaft being parallel to the conveyor screw whereby universal connections between the gearing and the power means are eliminated.

33. In a locomotive tender having fuel and water compartments and a deck, a stoker conduit mounted in the water compartment to communicate with the fuel compartment and having a portion extending exteriorly of the water compartment, fuel transfer means in said conduit, power means for driving said transfer means, said power means being rigidly secured to that portion of said conduit extending exteriorly of the water compartment and being positioned forward of the front end wall of the tender beneath said deck.

34. In a locomotive tender having a fuel bunker, a stoker conduit having a rearward open mouth portion communicating with the fuel bunker and a forward portion extending forwardly of the fuel bunker, a conveyor screw in said conduit, gearing at the rear of said conduit, a shaft extending forwardly from said gearing, power means connected to the forward end of said shaft, said power means being rigidly secured to the forward portion of said conduit at a point forward of the open mouth portion.

35. In a locomotive tender having an upright wall forming the forward end thereof, a deck extending forward from said wall, a water storage compartment and a fuel bunker rearward of said wall, a stoker conduit mounted in said water compartment in communication with the fuel bunker, a conveyor screw in the conduit, gearing at the rear end of the conduit, power means rigidly mounted on the tender for driving the conveyor screw, said power means being positioned forward of said upright wall, said compartment and fuel bunker, and beneath the deck, a drive shaft operatively connecting the gearing with the power means, said shaft being parallel to the conveyor screw, and a casing within the water compartment surrounding said shaft and protecting the same from the water of the water compartment.

36. In a locomotive tender, a body portion including a front wall and a water compartment rearward thereof, a deck extending forward from said front wall, said wall extending in the same vertical plane above and below said deck, a stoker conduit extending from beneath said deck through said wall into the water compartment, fuel transfer means in said conduit, and power means for driving said transfer means including a prime mover disposed beneath said deck forward of said front wall.

37. In a locomotive tender, a body portion including a front wall, a deck extending forward therefrom, said wall extending in the same vertical plane above and below said deck, a stoker trough, fuel transfer means in said trough, power means for driving said transfer means including a prime mover disposed beneath said deck forward of said front wall.

38. In a locomotive tender having a water compartment and a fuel bin, a stoker trough communicating with said bin and disposed within said water compartment, said trough having a projecting flange forming a wall portion of said water compartment, fuel transfer means in said trough, and power means for driving said transfer means, said power means being rigidly secured to said flange and protected from the water in said water compartment.

39. In a locomotive tender having a water storage compartment and a fuel bunker, a stoker trough in communication with the fuel bunker and disposed within said compartment so that water will be in contact with the sides and bottom of the trough, a conveyor screw in said trough, drive mechanism rigidly secured to an exterior wall of said compartment, and means operatively connecting said drive mechanism with said conveyor screw including a shaft extending through the water compartment.

40. In a locomotive tender having a water storage compartment and a fuel bunker, a stoker trough in communication with the fuel bunker and disposed within said compartment so that water will be in contact with the sides and bottom of the trough, a conveyor screw in said trough, gearing at the rear of said trough, drive mechanism rigidly secured to an exterior wall of said compartment, and means operatively connecting said drive mechanism with said gearing including a shaft extending through the water compartment.

NATHAN M. LOWER.